(12) United States Patent
Dunne

(10) Patent No.: US 8,411,257 B2
(45) Date of Patent: Apr. 2, 2013

(54) FOLDED PATH LASER RANGEFINDER ARCHITECTURE AND TECHNIQUE INCORPORATING A SINGLE CIRCUIT BOARD FOR MOUNTING OF BOTH LASER EMITTING AND DETECTING ELEMENTS

(75) Inventor: Jeremy G. Dunne, Highlands Ranch, CO (US)

(73) Assignees: Laser Technology, Inc., Centennial, CO (US); Kama-Tech (HK) Limited, Tsim Sha Tsui (HK)

( * ) Notice: Subject to any disclaimer, the term of this patent is extended or adjusted under 35 U.S.C. 154(b) by 197 days.

(21) Appl. No.: 12/778,000

(22) Filed: May 11, 2010

(65) Prior Publication Data

US 2011/0279808 A1 Nov. 17, 2011

(51) Int. Cl.
*G01C 3/08* (2006.01)
(52) U.S. Cl. .................. 356/4.01; 356/3.01; 356/4.1
(58) Field of Classification Search ........ 356/3.01–28.5, 356/139.01–139.1
See application file for complete search history.

(56) References Cited

U.S. PATENT DOCUMENTS

| | | | |
|---|---|---|---|
| 5,574,552 A | 11/1996 | Dunne | |
| 5,612,779 A | 3/1997 | Dunne | |
| 5,652,651 A | 7/1997 | Dunne | |
| 5,703,678 A | 12/1997 | Dunne | |
| 5,812,893 A * | 9/1998 | Hikita et al. | 396/106 |
| 5,880,821 A | 3/1999 | Dunne | |
| 5,926,260 A | 7/1999 | Dunne et al. | |
| 6,057,910 A | 5/2000 | Dunne | |
| 6,226,077 B1 | 5/2001 | Dunne | |
| 6,445,444 B2 | 9/2002 | Dunne | |
| 6,504,602 B1 * | 1/2003 | Hinderling | 356/5.1 |
| 7,349,073 B2 * | 3/2008 | Dunne | 356/4.01 |

* cited by examiner

*Primary Examiner* — Luke Ratcliffe
(74) *Attorney, Agent, or Firm* — William J. Kubida; Hogan Lovells US LLP

(57) ABSTRACT

A handheld, folded-path, laser rangefinder architecture and technique incorporating a single circuit board for mounting of both the laser emitting and detecting elements is disclosed. The architecture disclosed provides an efficient and low cost design for a laser rangefinder, and by eliminating the conventional provision of separate circuit boards for the laser transmitting and receiving elements, reduces the overall size of the unit and its cost of manufacture by concomitantly eliminating unnecessary interconnecting cables and the like.

34 Claims, 2 Drawing Sheets

US 8,411,257 B2

FOLDED PATH LASER RANGEFINDER ARCHITECTURE AND TECHNIQUE INCORPORATING A SINGLE CIRCUIT BOARD FOR MOUNTING OF BOTH LASER EMITTING AND DETECTING ELEMENTS

BACKGROUND OF THE INVENTION

The present invention relates, in general, to the field of electronic range finding instruments. More particularly, the present invention relates to a handheld, folded-path, laser rangefinder architecture and technique incorporating a single circuit board for mounting of both the laser emitting and detecting elements as well as at least some of the rangefinder's other electrical and electronic components such as, for example, the central processor, precision timing circuit, power supply and the like.

Laser rangefinders, such as those designed and produced by Laser Technology, Inc., Centennial, Colo., assignee of the present invention, operate to calculate distance by measuring the time of flight of very short pulses of infrared light. That is, a measurement is made as to the time it takes one or more laser pulses to travel to a target and back with a precision time base. With knowledge of the constant speed of light, the distance the laser pulses have traveled can then be calculated.

In order to increase accuracy, such laser rangefinders are designed to process multiple pulses in a single measurement period, with target acquisition times typically ranging from 0.3 to 0.7 seconds. Sophisticated accuracy validation algorithms are then utilized to ensure reliable distance measurements and eliminate spurious signals due to noise and other factors.

Laser Technology, Inc. has pioneered and developed the design and measurement functionality found in some of the most popular lines of recreational rangefinders currently available on the market. Representative of its proprietary technology is that disclosed in U.S. Pat. Nos. 5,574,552; 5,612,779; 5,652,651; 5,703,678; 5,880,821; 5,926,260; 6,057,910; 6,226,077 and 6,445,444, the disclosures of which are herein specifically incorporated by this reference in their entirety. Such recreational rangefinders are ideal for sporting activities such as golfing and hunting with their major appeal being that they are extremely compact, lightweight and affordable for their intended uses.

SUMMARY OF THE INVENTION

Provided herein is a handheld, folded-path, laser rangefinder architecture and technique incorporating a single circuit board for mounting of both the laser emitting and detecting elements. The single circuit board may also contain others of the device's electrical and electronic components such as the central processor, precision timing circuit, power supply and the like. The architecture disclosed provides an efficient and low cost design for a laser rangefinder, and by eliminating the conventional provision of separate circuit boards for the laser transmitting and receiving elements as well as other components and circuits, reduces the overall size of the unit and its cost of manufacture by concomitantly eliminating unnecessary interconnecting cables and the like.

Specifically disclosed herein is a rangefinding instrument which comprises a generally elongated handheld housing with a single circuit board disposed within. Laser emitting and laser detecting elements are affixed to at least one of the two major surfaces of the circuit board and a first beam redirecting structure directs laser signals from the laser emitting element toward a target and a second beam redirecting structure directs target reflected laser signals toward the laser detecting element.

Also disclosed herein is a rangefinding instrument which comprises a housing and an ocular pathway disposed through the housing for viewing and aiming the instrument towards a target. A single circuit board is disposed within the housing having at least one component mounting surface thereof. A signal emitting device is affixed to said at least one component mounting surface of said circuit board as is a signal receiving device. A first signal redirector intercepts a signal transmitted from the signal emitting device and redirects the transmitted signal toward the target and a second signal redirector intercepts a received signal reflected from the target in response to the transmitted signal and redirects the received signal toward the signal receiving device.

Further disclosed herein is a method for constructing a laser rangefinder comprising providing a housing having an ocular pathway associated therewith and mounting a circuit board within the housing. A laser emitting element and a laser detecting element are affixed to the circuit board. Transmitted laser energy is firstly redirected from the laser emitting element substantially 90 degrees to a target along the ocular pathway, with the transmitted laser energy defining a laser transmit path. Reflected laser energy from the target is secondly redirected substantially 90 degrees to the laser detecting element, with the reflected laser energy defining a laser receive path.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1A:
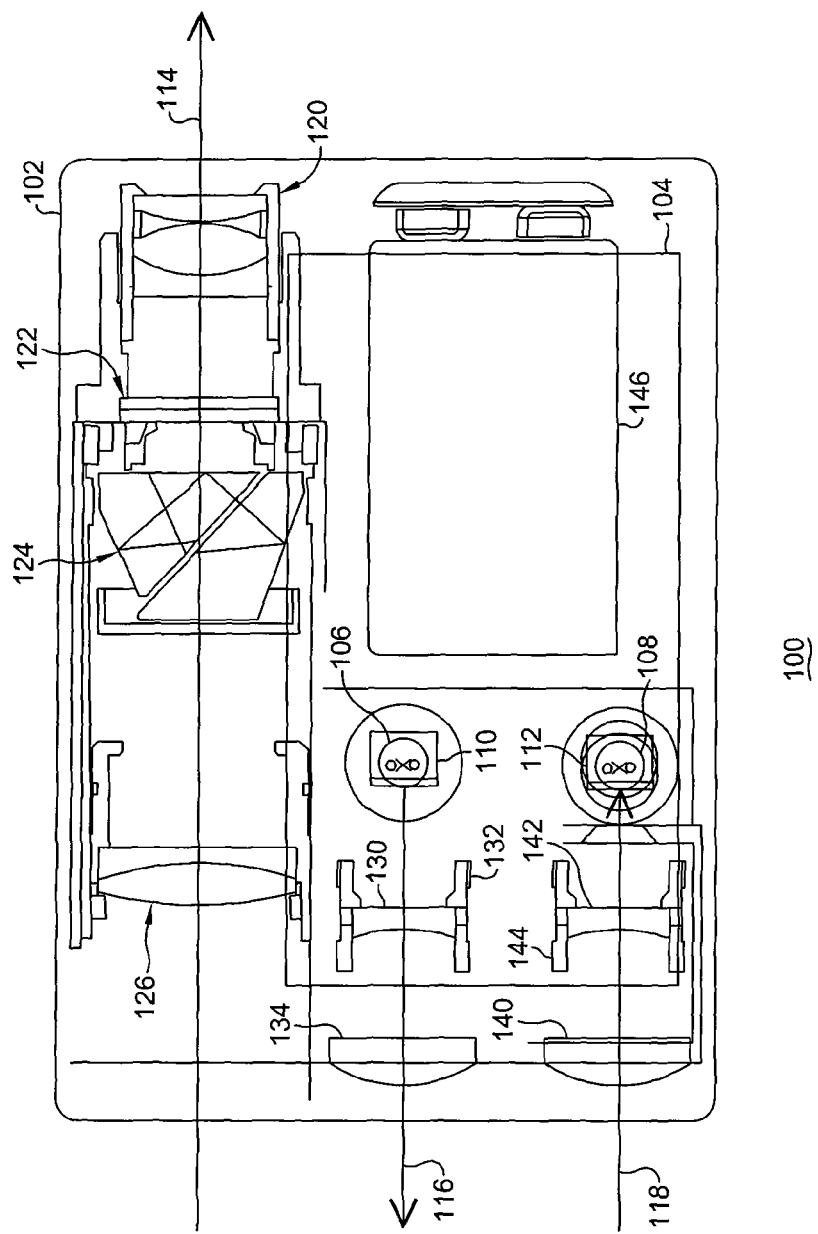
FIG. 1A is a cut away, side elevational view of a rangefinder in accordance with an exemplary embodiment of the present invention illustrating the fundamental architecture thereof inclusive of a single circuit board supporting both laser emitting and receiving elements thereof.
Figure 1B:
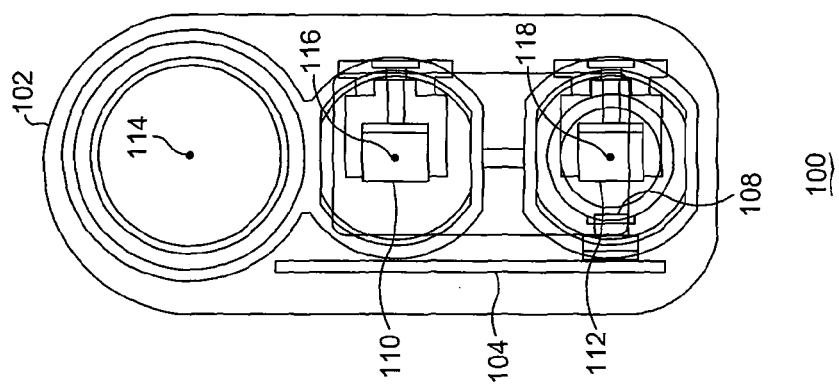
FIG. 1B is a cut away, front elevational view of the rangefinder of the preceding figure further illustrating the single circuit board as well as head-on views of the optical path, laser transmit path and reflected laser light receive path as previously shown.

With reference now to FIGS. 1A and 1B, cut away views of an exemplary embodiment of a rangefinder 100 in accordance with the present invention are shown. The rangefinder 100 comprises a housing 102 which is of sufficiently compact dimensions as to be readily handheld and/or tripod mountable if desired. Within the housing 102 is a circuit board 104 to which the laser emitting device 106 and laser detecting device 108 are both affixed, mounted or otherwise secured. It should be noted that the laser emitting device 106 and the laser detecting device 108 may be mounted to the same or opposite one of the major surfaces of the circuit board 104 without departing from the scope and spirit of the present invention. The circuit board 104 also contains the rangefinder's other electrical and electronic components (not shown). Such other components may comprise, for example, a central processing unit (CPU), a precision timing circuit, a power supply, a tilt sensor or inclinometer and the like.

Associated with the laser emitting device 106 is a mirror 110, or other beam reflecting or redirecting mechanism for redirecting the emitted laser beam pulses from the rangefinder 100 towards a target object. In like manner, a mirror 112, or other beam reflecting or redirecting mechanism, is associated with the laser detecting device 108 for redirecting reflected laser pulses from a target toward the laser detecting device 108.

As shown, the rangefinder 100 presents an optical path 114 wherein light reflected from a scene towards which the unit is aimed is presented to a user. A laser transmit path 116 is aligned with the optical path 114 such that laser pulses from the laser emitting device 106 are directed towards a target object or feature towards which the rangefinder 100 is aimed. A laser receive path 118, in turn, directs laser beam pulses reflected from the selected target object or feature towards which the rangefinder 100 is aimed to the laser detecting device 108.

The optical path 114 of the rangefinder 100 includes an eyepiece 120 which, in the representative embodiment shown, comprises a number of lenses which are adjustable along the optical path 114 in a conventional manner in order to focus the scene viewed through the eyepiece to the user. In this regard, it should be noted that the principles of the present invention are likewise applicable to perma-focus devices as well as those having adjustable focus. Placed in the optical path is an aiming reticle forming a portion of an LCD in-sight display 122 to enable aiming of the rangefinder 100 toward a selected feature or object within the scene in order to measure the distance thereto. The in-sight display may, optionally, display the measured distance from the rangefinder 100 to the feature or object among other user information regarding the rangefinder 100 functionality or surrounding conditions such as that disclosed in the aforementioned U.S. Pat. No. 6,057,910. In the representative embodiment of the rangefinder 100 shown, the optical path 114 further comprises a roof prism 124 and an objective lens 126 comprising doublet bi-convex and plano-convex lenses.

The laser transmit path 116 comprises, in the embodiment illustrated, the adjustable mirror 110, an optional negative meniscus (or plano-concave) lens 130 secured within a mounting ring 132 and a fixed (or movable in embodiments not including a lens 130) plano-convex lens 134. Similarly, the laser receive path 118 comprises a plano-convex lens 140 in association with an optional negative meniscus (or plano-concave) lens 142 which is held within a mounting ring 144. As with the mounting ring 132 of the laser transmit path, in certain embodiments of the rangefinder 100 of the present invention, the lens 142 may be movable in association with a fixed lens 140 as will be more fully described hereinafter. In embodiments not incorporating either lens 130 and/or 142, the corresponding lenses 134 and/or 140 may be movable in order to provide appropriate focusing to the transmitted or received laser pulses. Also as shown, the rangefinder 100 may be powered, for example, by a single battery 146 which is illustrated to provide an approximate scale for the dimensions of the rangefinder 100.

Figure 2:
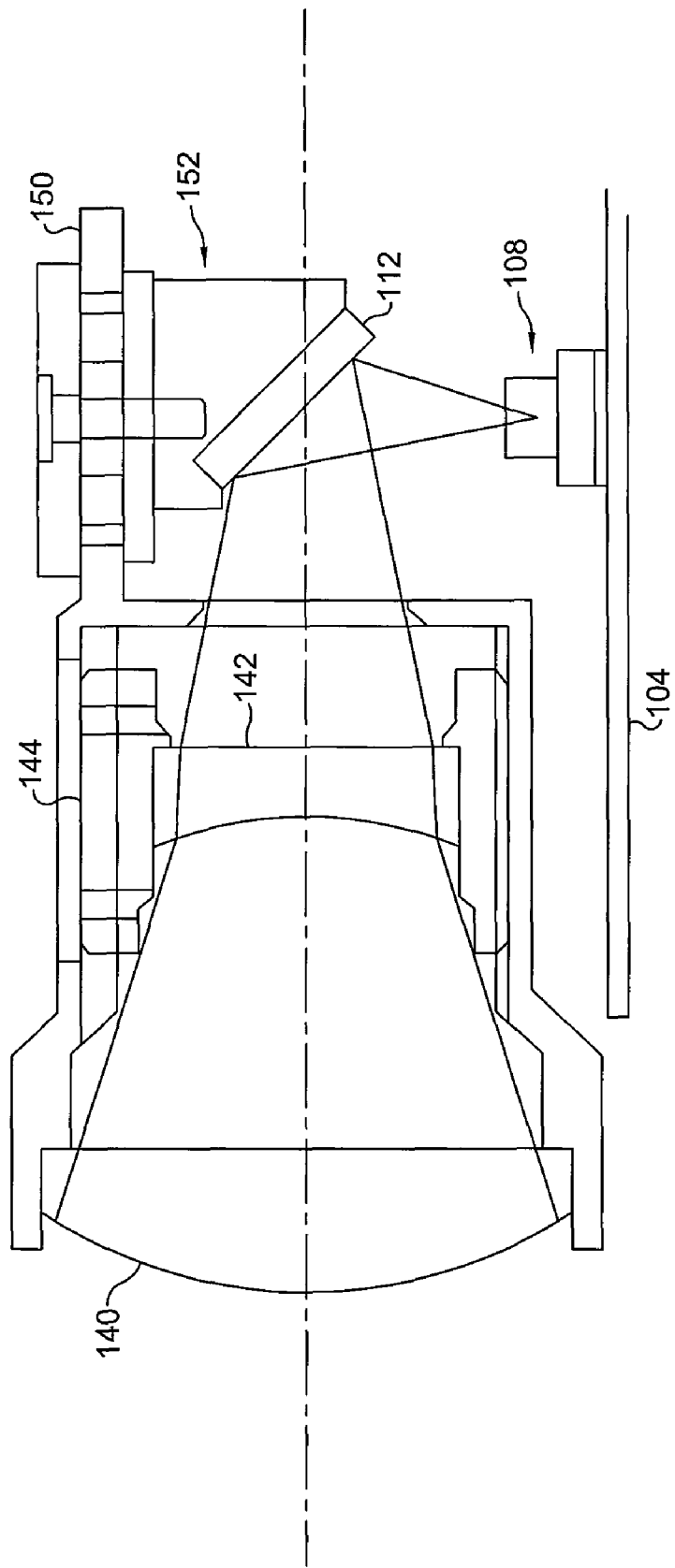
FIG. 2 is a more detailed, cut away, top plan view of a representative lens and mirror mounting and focus adjustment technique for possible use in the rangefinder embodiment of the preceding figures illustrating, for example, a fixed convex lens and optional, associated adjustable negative meniscus lens for focus adjustment.

With reference additionally now to FIG. 2, a more detailed, cut away, top plan view of a representative lens and mirror mounting and focus adjustment technique for possible use in the rangefinder 100 is shown. Although illustrated and described with respect to the laser receive path 118, the following description is likewise applicable to the corresponding elements of the laser transmit path as well.

As previously described, the laser detecting device 108 is physically and electrically coupled to the circuit board 104, as is the laser emitting device 106 (not shown). Laser pulses reflected from a target toward which the rangefinder 100 is aimed are received through the lens 140 in conjunction with a movable negative meniscus lens 142 which is held within an adjustable mounting ring 144. In the embodiment illustrated, the mounting ring 144 may be moved and secured within the housing 102 (FIGS. 1A and 1B) in order to focus the received, reflected laser pulses on the laser detecting device 108. In embodiments of the rangefinder not incorporating an adjustable lens 142, the lens 140 may then be made adjustable instead of fixed in order to focus the received, reflected laser pulses on the laser detecting devices 108.

The mirror 112 is affixed to a mounting block 152 which is slidably and rotatably mounted to a portion 150 of the housing 102. In this manner, the mirror 110 of the laser transmit path 116 can be steered, or positioned, and secured during alignment of the rangefinder 100 such that the laser transmit path 116 is aligned to the optical path (FIGS. 1A and 1B). Similarly, the mirror 112 of the laser receive path 118 can be steered, or positioned, and secured during alignment of the rangefinder 100 such that the laser receive path 118 is aligned to the laser transmit path 116. In alternative embodiments of the rangefinder 100 of the present invention, the circuit board 104 mounting holes may be slotted to allow adjustment and alignment of the laser transmit and receive paths 116, 118 in lieu of, or in addition to the user of steering mirrors 110, 112. In still other embodiments of the present invention, an additional circuit board (not shown) may be included for associated visual display circuitry or providing other ancillary functionality.

While there have been described above the principles of the present invention in conjunction with a specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. Further, as utilized herein, the phrase "substantially 90 degrees" is intended to include a range of from approximately 80 degrees to 100 degrees without departing from the scope and spirit of the present invention. Moreover, none of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A rangefinding instrument comprising:
   a housing;
   an ocular pathway disposed through said housing for viewing and aiming said instrument towards a target;
   a single circuit board disposed within said housing, said circuit board having two major surfaces thereof;
   a signal emitting device affixed to a first one of said two major surfaces of said circuit board;
   a signal detecting device affixed to said first one of said two major surfaces of said circuit board in a substantially coplanar relationship to said signal emitting device;
   a first signal redirector for intercepting a signal transmitted from said signal emitting device and redirecting said transmitted signal toward said target; and
   a second signal redirector for intercepting a received signal reflected from said target in response to said transmitted signal and redirecting said received signal toward said signal receiving device.

2. The rangefinding instrument of claim 1 wherein said housing may be handheld.

3. The rangefinding instrument of claim 1 wherein said ocular pathway includes an aiming reticule for enabling a user to aim said instrument towards said target.

4. The rangefinding instrument of claim 1 wherein said ocular pathway includes an in-sight display of information regarding a distance from said instrument to said target.

5. The rangefinding instrument of claim 1 wherein said signal emitting device comprises a laser diode.

6. The rangefinding instrument of claim 5 wherein said laser diode is a pulse laser diode.

7. The rangefinding instrument of claim 1 wherein said signal detecting device is a photodiode.

8. The rangefinding instrument of claim 1 wherein said first and second signal redirectors comprise respective first and second mirrors.

9. The rangefinding instrument of claim 8 wherein said first and second mirrors respectively redirect said transmitted and received signals substantially 90 degrees toward said signal emitting and signal receiving devices.

10. The rangefinding instrument of claim 8 wherein said first and second mirrors are adjustable to align said transmitted and received signals to said signal emitting and signal detecting devices.

11. The rangefinding instrument of claim 1 further comprising:
    an additional circuit board comprising visual display circuitry.

12. The rangefinding instrument of claim 1 further comprising:
    additional circuit elements affixed to at least one of said two major surfaces of said circuit board, said additional circuit elements comprising at least one of a central processing unit, portions of a precision timing circuit or portions of a power supply circuit.

13. A rangefinding instrument comprising:
    a generally elongated handheld housing;
    a single circuit board disposed within said housing said circuit board having two major surfaces thereof;
    laser emitting and laser detecting elements in a substantially coplanar relationship with each other and each respectively affixed to a first one of said two major surfaces of said circuit board;
    a first beam redirecting structure for directing transmitted laser signals from said laser emitting element toward a target; and
    a second beam redirecting structure for directing target reflected laser signals toward said laser detecting element.

14. The rangefinding instrument of claim 13 further comprising an ocular pathway for viewing and aiming said instrument toward said target.

15. The rangefinding instrument of claim 14 further comprising an in-sight display of information regarding a distance from said instrument to said target.

16. The rangefinding instrument of claim 13 wherein said laser emitting element comprises a laser diode.

17. The rangefinding instrument of claim 16 wherein said laser diode is a pulse laser diode.

18. The rangefinding instrument of claim 13 wherein said laser detecting element comprises a photodiode.

19. The rangefinding instrument of claim 13 wherein said first and second beam redirecting structures comprise respective first and second mirrors.

20. The rangefinding instrument of claim 19 wherein said first and second mirrors respectively redirect said transmitted laser signals and said target reflected laser signals substantially 90 degrees toward said laser emitting and laser detecting elements.

21. The rangefinding instrument of claim 19 wherein said first and second mirrors are adjustable to align said transmitted and target reflected laser signals to said laser emitting and laser detecting elements respectively.

22. The rangefinding instrument of claim 13 wherein said circuit board is movable within said housing to align said transmitted and target reflected laser signals to said laser emitting and laser detecting elements.

23. The rangefinding instrument of claim 13 further comprising:
    an additional circuit board comprising visual display circuitry.

24. The rangefinding instrument of claim 13 further comprising:
    additional circuit elements affixed to at least one of said two major surfaces of said circuit board, said additional circuit elements comprising at least one of a central processing unit, portions of a precision timing circuit or portions of a power supply circuit.

25. A method for constructing a laser rangefinder comprising:
    providing a housing having an ocular pathway associated therewith;
    mounting a circuit board within said housing;
    affixing a laser emitting element and a laser detecting element to a first side of said circuit board in a substantially coplanar relationship;
    firstly redirecting transmitted laser energy from said laser emitting element substantially 90 degrees to a target along said ocular pathway, said transmitted laser energy defining a laser transmit path; and secondly redirecting reflected laser energy from said target substantially 90 degrees to said laser detecting element, said reflected laser energy defining a laser receive path.

26. The method of claim 25 wherein said steps of firstly and secondly redirecting are carried out by respective first and second mirrors.

27. The method of claim 25 further comprising:
adjusting said first mirror to align said laser transmit path to said ocular pathway; and
adjusting said second mirror to align said laser receive path to said laser transmit path.

28. The method of claim 25 further comprising:
inserting a first plano-convex lens in said laser transmit path; and
inserting a second plano-convex lens in said laser receive path.

29. The method of claim 28 further comprising:
adjusting said first and second plano-convex lenses to focus signals on said laser transmit and laser receive paths respectively.

30. The method of claim 28 further comprising:
inserting a first plano-concave lens in said laser transmit path between said first plano-convex lens and said laser emitting element; and
inserting a second plano-concave lens in said laser receive path between said second plano-convex lens and said laser detecting element.

31. The method of claim 30 further comprising:
adjusting said first and second plano-concave lenses to focus signals on said laser transmit and laser receive paths respectively.

32. A rangefinding instrument comprising:
a generally elongated handheld housing;
a single circuit board disposed within said housing said circuit board having two major surfaces thereof;
laser emitting and laser detecting elements each respectively affixed to at least one of said two major surfaces of said circuit board;
a first beam redirecting structure for directing transmitted laser signals from said laser emitting element toward a target; and
a second beam redirecting structure for directing target reflected laser signals toward said laser detecting element
wherein said circuit board is movable within said housing to align said transmitted and target reflected laser signals to said laser emitting and laser detecting elements.

33. A method for constructing a laser rangefinder comprising:
providing a housing having an ocular pathway associated therewith;
mounting a circuit board within said housing;
affixing a laser emitting element and a laser detecting element to said circuit board;
firstly redirecting transmitted laser energy from said laser emitting element substantially 90 degrees to a target along said ocular pathway, said transmitted laser energy defining a laser transmit path;
secondly redirecting reflected laser energy from said target substantially 90 degrees to said laser detecting element, said reflected laser energy defining a laser receive path;
inserting a first plano-convex lens in said laser transmit path; and
inserting a second plano-convex lens in said laser receive path,
inserting a first plano-concave lens in said laser transmit path between said first plano-convex lens and said laser emitting element; and
inserting a second plano-concave lens in said laser receive path between said second plano-convex lens and said laser detecting element.

34. The method of claim 33 further comprising:
adjusting said first and second plano-concave lenses to focus signals on said laser transmit and laser receive paths respectively.

* * * * *